(12) United States Patent
Tyburski

(10) Patent No.: US 12,159,024 B1
(45) Date of Patent: Dec. 3, 2024

(54) DATABASE INTERACTIVITY AND USER INTERFACE IMPROVEMENTS

(71) Applicant: SOFTCAFE, L.L.C., Bethesda, MD (US)

(72) Inventor: Scott Joseph Tyburski, Bethesda, MD (US)

(73) Assignee: SOFTCAFE, L.L.C., Bethesda, MD (US)

( * ) Notice: Subject to any disclaimer, the term of this patent is extended or adjusted under 35 U.S.C. 154(b) by 0 days.

(21) Appl. No.: 16/997,635

(22) Filed: Aug. 19, 2020

Related U.S. Application Data

(60) Continuation of application No. 16/361,428, filed on Mar. 22, 2019, now abandoned, which is a division of application No. 15/231,594, filed on Aug. 8, 2016, now Pat. No. 10,249,010, which is a continuation of application No. 13/949,305, filed on Jul. 24, 2013, now abandoned.

(60) Provisional application No. 61/675,144, filed on Jul. 24, 2012.

(51) Int. Cl.
| | |
|---|---|
| *G06F 17/00* | (2019.01) |
| *G06F 3/04842* | (2022.01) |
| *G06F 8/38* | (2018.01) |
| *G06F 9/451* | (2018.01) |
| *G06F 16/25* | (2019.01) |

(52) U.S. Cl.
CPC ............ *G06F 3/04842* (2013.01); *G06F 8/38* (2013.01); *G06F 9/451* (2018.02); *G06F 16/252* (2019.01)

(58) Field of Classification Search
CPC .......... G06Q 30/0621; G06Q 30/0643; G06Q 30/0603; G06F 3/0482; G06F 16/252; G06F 3/04842; G06F 9/451; G06F 8/38
See application file for complete search history.

(56) References Cited

U.S. PATENT DOCUMENTS

| | | | |
|---|---|---|---|
| 5,899,502 A * | 5/1999 | Del Giorno | ............ G06Q 99/00 283/67 |
| 6,384,850 B1 | 5/2002 | McNally | |
| 6,658,418 B2 * | 12/2003 | Burns | ................. G06F 3/04842 345/650 |
| 6,871,325 B1 | 3/2005 | McNally et al. | |
| 6,982,733 B1 | 1/2006 | McNally et al. | |

(Continued)

FOREIGN PATENT DOCUMENTS

| | | | | |
|---|---|---|---|---|
| WO | WO-03003182 A1 * | 1/2003 | ............ | G06F 3/0489 |
| WO | WO-2006131887 A1 * | 12/2006 | ............ | G11B 27/105 |

*Primary Examiner* — Laurie A Ries
(74) *Attorney, Agent, or Firm* — Oliver Edwards; Office of Oliver Edwards LLC

(57) ABSTRACT

Systems and methods for database interactivity and user interfaces pertaining to creating, customizing, and synchronizing custom selection lists are disclosed. The present invention may include a software program. A user may use the software program to input the names of a plurality of selectable items for storage in a database. When the user is creating a selection list, the user may select the saved selectable items and arrange and format them in a preview interface. In other aspects of the present invention, multiple custom selection lists are stored onto the database and a user may edit a first custom selection list which synchronizes with and thereby makes the same edit on a second custom selection list.

10 Claims, 2 Drawing Sheets

(56) References Cited

U.S. PATENT DOCUMENTS

| | | | |
|---|---|---|---|
| 7,127,679 B2 * | 10/2006 | Cohen | G06F 9/451 |
| | | | 715/744 |
| 7,188,316 B2 * | 3/2007 | Gusmorino | G06F 16/168 |
| | | | 715/764 |
| 7,213,039 B2 | 5/2007 | Ramanujam et al. | |
| 7,447,713 B1 | 11/2008 | Berkheimer | |
| 7,711,600 B1 | 5/2010 | Curran et al. | |
| 7,721,228 B2 * | 5/2010 | Burke | G06F 16/957 |
| | | | 715/810 |
| 8,494,896 B1 * | 7/2013 | Lagana | G06Q 10/10 |
| | | | 705/7.29 |
| 8,903,708 B2 | 12/2014 | Derks | G06Q 30/02 |
| | | | 704/277 |
| 2001/0042075 A1 | 11/2001 | Tabuchi | |
| 2002/0082953 A1 * | 6/2002 | Batham | G06Q 40/04 |
| | | | 705/26.62 |
| 2004/0046804 A1 * | 3/2004 | Chang | G06F 3/0482 |
| | | | 715/810 |
| 2004/0230915 A1 * | 11/2004 | Diering | G06F 9/451 |
| | | | 715/810 |
| 2005/0038760 A1 * | 2/2005 | Rasmussen | G06Q 99/00 |
| | | | 705/500 |
| 2005/0039141 A1 * | 2/2005 | Burke | G06F 3/0482 |
| | | | 715/845 |
| 2005/0138082 A1 | 6/2005 | Rauma | |
| 2005/0204308 A1 | 9/2005 | McNally | |
| 2005/0216834 A1 * | 9/2005 | Gu | G06F 40/143 |
| | | | 715/248 |
| 2006/0020497 A1 * | 1/2006 | McNally | G06Q 30/0643 |
| | | | 705/5 |
| 2006/0195510 A1 | 8/2006 | McNally | |
| 2007/0150371 A1 * | 6/2007 | Gangji | G06Q 30/0601 |
| | | | 705/26.1 |
| 2007/0265935 A1 * | 11/2007 | Woycik | G07F 5/18 |
| | | | 705/26.5 |
| 2008/0319983 A1 | 12/2008 | Meadows | |
| 2009/0112936 A1 | 4/2009 | Luitjens | |
| 2009/0132943 A1 | 5/2009 | Minsky | |
| 2009/0275002 A1 * | 11/2009 | Hoggle | G16H 20/60 |
| | | | 707/999.1 |
| 2010/0094715 A1 * | 4/2010 | Kim | G06Q 30/02 |
| | | | 705/15 |
| 2010/0100214 A1 * | 4/2010 | MacDonald | G06F 40/103 |
| | | | 700/97 |
| 2010/0161667 A1 | 6/2010 | Hardy | |
| 2011/0016431 A1 * | 1/2011 | Grosz | G06F 18/24 |
| | | | 715/841 |
| 2011/0041097 A1 * | 2/2011 | Danninger | G06F 3/0482 |
| | | | 715/841 |
| 2011/0123964 A1 * | 5/2011 | Aronis | G16H 20/60 |
| | | | 434/127 |
| 2011/0137860 A1 | 6/2011 | Shin | |
| 2011/0238621 A1 | 9/2011 | Agrawal | |
| 2011/0265035 A1 * | 10/2011 | Lepage | G06F 3/0482 |
| | | | 715/810 |
| 2011/0283173 A1 | 11/2011 | Babcock | |
| 2012/0016754 A1 * | 1/2012 | Jackson | G06Q 10/0631 |
| | | | 705/15 |
| 2012/0087537 A1 | 4/2012 | Liu | |
| 2012/0185362 A1 * | 7/2012 | Qian | G06Q 30/0641 |
| | | | 705/27.1 |
| 2012/0227000 A1 * | 9/2012 | McCoy | G06F 3/0482 |
| | | | 715/762 |
| 2012/0290390 A1 | 11/2012 | Harman | |
| 2012/0290413 A1 | 11/2012 | Harman | |
| 2012/0290414 A1 | 11/2012 | Harman | |
| 2012/0303470 A1 * | 11/2012 | Arsenault | G06Q 10/00 |
| | | | 705/15 |
| 2012/0323707 A1 * | 12/2012 | Urban | G06Q 30/06 |
| | | | 705/15 |
| 2015/0317049 A1 * | 11/2015 | Miura | G06F 3/0482 |
| | | | 715/843 |

* cited by examiner

DATABASE INTERACTIVITY AND USER INTERFACE IMPROVEMENTS

BACKGROUND

Background of the Invention

The present invention relates to improvements in database interactivity and user interfaces related to custom selection list (e.g., menu) creation and design including, for example, the synchronization and storage of multiple lists and selectable items during the creation and design process.

In a restaurant, a menu is a presentation of food and beverage offerings. A menu may be a la carte, which guests use to choose from a list of options, or table d'hôte, in which case a pre-established sequence of courses is served. Typically, restaurants may have more than one menu. For example, the restaurant may have a breakfast, lunch and dinner menu as well as a catering menu, appetizer menus and the like. Currently to create menus, a restaurant owner may use an online program. However, the multiple menus of the restaurant are not linked and stored on a database, so each time a restaurant owner needs to change a menu item; they have to change the item on each individual menu.

As can be seen, there is a need for a system that synchronizes multiple menus when making edits.

SUMMARY OF THE INVENTION

In one aspect of the present invention, a system for creating menus comprises: a computer having a user interface; and a program product comprising machine-readable program code for causing, when executed, the computer to perform the following process steps: prompting a user to create and access an account; prompting a user to input food items, wherein the food items comprise names of dishes to be displayed on the menu; saving the inputted food items to a database; displaying the food items in an itemized panel; displaying a preview of at least one menu; and prompting a user to create a personalized menu by adding the created food items to the preview of the at least one menu.

In another aspect of the present invention, a system for creating menus comprises: a computer having a user interface; and a program product comprising machine-readable program code for causing, when executed, the computer to perform the following process steps: prompting a user to create and access an account; producing a customizable preview of a plurality of menus comprising at least one first menu and second menu; prompting a user to select either the first menu or the second menu to edit; synchronizing the first menu and the second menu, wherein when the first menu is edited, the second menu is edited in the same fashion; and storing the plurality of menus on a database.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system and method of creating and customizing menus for a restaurant. The present invention may include a software program. A user may use the software program to input the names of a plurality of food items served at the restaurant. A database may save the inputted food items. When the user is creating a menu, the user may select the saved food items and arrange them on a preview menu. Once finished with the menu, the user may print and use the menu at a restaurant. In other aspects of the present invention, when multiple menus are stored onto the database, a user may edit a first menu which synchronizes with and thereby makes the same edit on a second menu.

The present invention may include an automated menu design and creation system and method. In certain embodiments of the present invention, a user may login to a personal account on a computer database to enter, store, and save food items, and then compose a food-selection menu based on pre-selected styles. The present invention allows users to quickly create a food-selection menu in less time than any other available method. Further, the menus may be saved to the database for future edits.

In certain embodiments, the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

Figure 1:
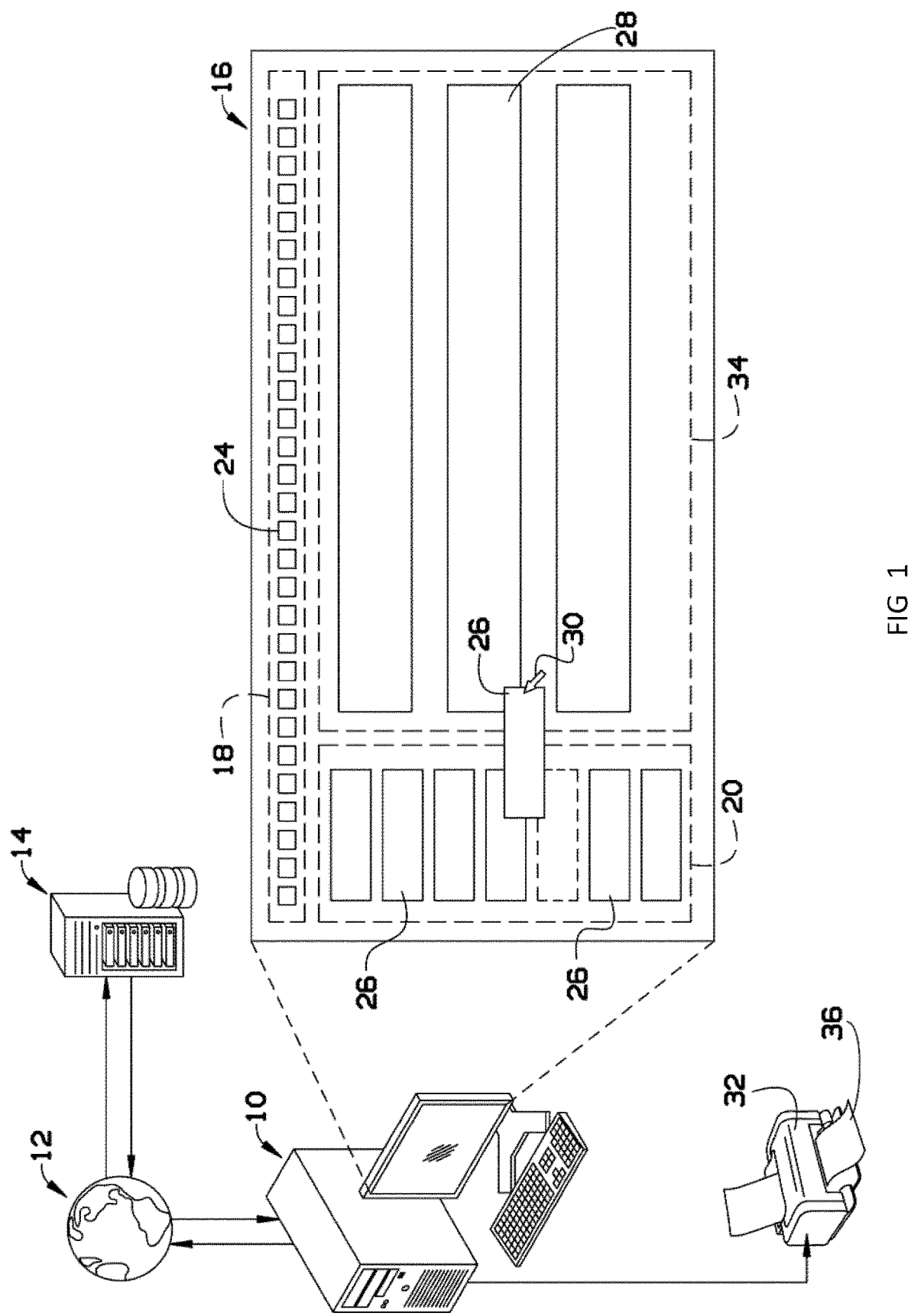
FIG. 1 illustrates a schematic view in accordance with an embodiment the present invention.

Referring to the FIG. 1, the present invention may include a software program. A user may implement the software program using a computer 10. Each user may sign up for the program by creating an account with a unique username and password. Further, the software application may link the computer 10 to a database 14. In certain embodiments, the software may link the computer 10 to the database 14 using the internet 12. Once a user has signed into their account, the user may create menus and access menus stored on the database 14.

The database 14 of the present invention may store one or more menus that are associated with each account. In certain embodiments, the database 14 may further store standard menu items 26 that are common to most restaurants. The database 14 may further store menu items 26 that have been inputted and saved to the database by the account owner. The menu items 26 may include the names and descriptions of food dishes. The menu items 26 may be stored so that the account user may use the stored menu items 26 in the future. For example, if a user creates a dinner menu, the user may create and store menu items 26 to be displayed on the dinner menu. The user may then create a lunch menu which may include some common food items 26 from the dinner menu. Thereby, the user may use the food items 26 created for the dinner menu to create the new lunch menu at a quicker pace.

Figure 2:
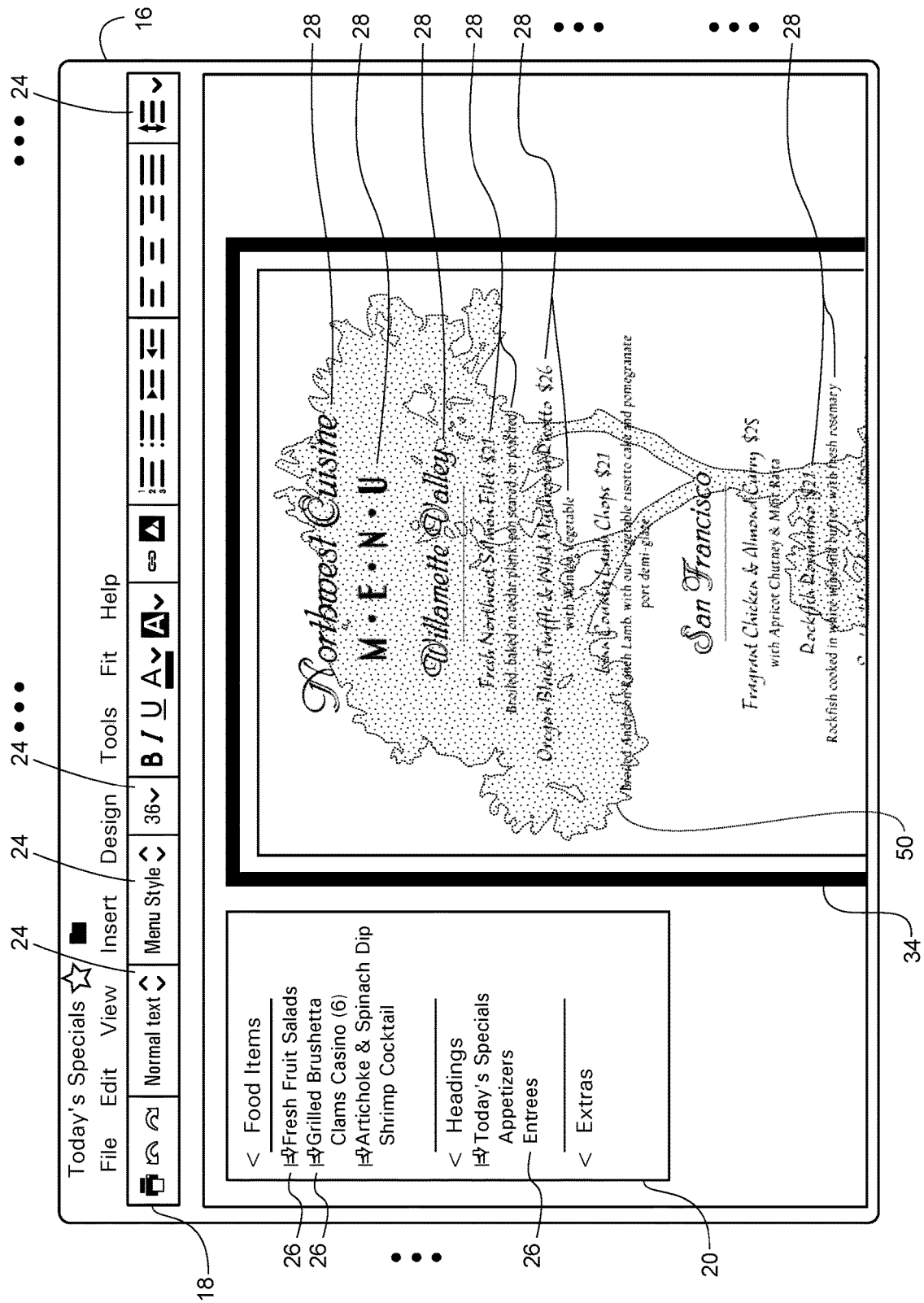
FIG. 2 illustrates an exemplary screenshot in accordance with an aspect of the present invention.

With reference to FIGS. 1 and 2, the software program may include a webpage layout 16 to create the menus 34. As mentioned above, the present invention may include stored menu items 26. The stored menu items 26 may be displayed in a side panel 20. In certain embodiments, when a user would like to add a menu item 26 from the side panel 20, a user may drag the menu item 26 directly to a preview menu 34 using a cursor 30. The preview menu 34 may be in a preview panel 34 which may be adjacent to the side panel 20. Once added to the preview menu 34, a stored menu item 26 may expand to an expanded menu item 28 to give the user a preview of the menu item 26 on the menu 34. However, the menu items 28 may be added to the preview menu 34 by any method desired.

The webpage layout 16 may further include a toolbar 18. The toolbar 18 may be used to change the design and color of the menu 34. For example, the tool bar 18 may be used to change the font and size of the words, and color of the background. The toolbar 18 may also be used for the importation of designs and pictures (such as watermark 50 shown in FIG. 2), the arrangement of the menu, and the like. As illustrated, the toolbar 18 may include multiple tools 24 to choose from to personally customize the preview menu 34. Once a user is finished with a menu 34 on the program, the user may print the menu 36 out using a printer 32 connected to the computer 10.

As shown in an illustrative exemplary screenshot in FIG. 2, toolbar 18 controls 24 may include, as illustrated from left to right, a print control, undo control, and redo control plus formatting tool controls including font family select control tool, style select control tool, bold control tool, italics control tool, underline control tool, color select control tool, background color select control tool, hyperlink control tool, image control tool, numbered paragraph control tool, bulleted paragraph control tool, indent control tool, un-indent control tool, left-justify control tool, center-justify control tool, right-justify control tool, justified control tool, and line-spacing select control tool.

As mentioned above, a user may have multiple menus 34 for a single restaurant. In certain embodiments, the multiple menus 34 may be synchronized on the database 14. Therefore, if a user changes a certain aspect of one menu 34, that particular aspect is changed on some or all of the other menus. A user may select which aspects of the menus the user would like to synchronize. For example, a user may synchronize the menu items 26. Therefore, when a menu item 26 is edited on one menu 34, the same changes may be made automatically on some or the rest of the menus 34 saved to the particular account. The menus 34 may also be synchronized based on changes made using the toolbar 18. Therefore, if a user would like to change a style of the menus 34, the user may have to only make the changes to one of the menus 34 and then the rest of the menus 34 may be synchronized with the same changes.

A method of using the present invention may include the following. The user may enter his or her food menu items that he or she serves at his establishment into the database. The user may then select which of these items should be included in their menu. The user may then select one of the pre-designed styles. The software then, based on the chosen style, formats the food selection menu using fonts, layout, design, and artwork and automatically fits the content to the menu page. The user may then save the menu to recall later to make changes, or may compose a new menu from the list of food items already in the database, without having to re-type the content and design of the menu. The user may also add or remove food items from the database at any time.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A database-driven system for creating restaurant menus from stored food items, said system comprising:
 a computer operably connected with a user interface and a food items and menu database; and
 a computer program product comprising machine-readable program code stored on a nontransitory computer-readable medium for causing, when executed, the computer to perform the following process steps:
 prompting a user to create and access an account;
 prompting the user to input food items, wherein a food item comprises a user configurable food item name for display on a menu;
 storing the inputted food items in the database for use in a plurality of user's menus associated with the account;
 displaying, on the user interface, a plurality of food items from the database in an itemized panel;
 displaying, on the user interface simultaneously with the itemized panel, a preview menu in a preview panel;
 providing, on the user interface, a plurality of formatting tool controls including a style select control tool;
 receiving an indication of a style selection via the style select control tool, wherein a style comprises a plurality of formatting aspects;
 formatting the preview menu in accordance with the indicated style selection after the preview menu has been populated;
 populating the preview menu by first, receiving, via the user interface, an indication of a selection of a stored food item to add to the preview menu; and second, adding the indicated selected stored food item to the preview menu; and storing the preview menu in the database.

2. The system of claim 1, wherein the indication of a selection of a stored food item comprises the user dragging a selected stored food item from the itemized panel onto the preview panel.

3. The system of claim 2, wherein the preview panel is updated instantly in accordance with the indicated style selection.

4. The system of claim 3, wherein the user interface comprises a web browser.

5. The database-driven system of claim 1, wherein formatting the preview menu in accordance with the indicated style selection comprises automatically fitting preview menu content to the preview menu.

6. A method for creating restaurant menus from food items stored in a food items and menu database, the method comprising the following steps:

prompting a user, via a computer interface, to create and access an account;

prompting the user, via the computer interface, to input food items, wherein a food item comprises a user configurable food item name for display on a menu;

storing the inputted food items in the database for use in a plurality of user's menus associated with the account;

displaying, on the user interface, a plurality of food items from the database in an itemized panel;

displaying, on the user interface simultaneously with the itemized panel, a preview menu in a preview panel;

providing, on the user interface, a plurality of formatting tool controls including a style select control tool;

receiving an indication of a style selection via the style select control tool, wherein a style comprises a plurality of formatting aspects;

formatting the preview menu in accordance with the indicated style selection after the preview menu has been populated;

populating the preview menu by first, receiving, via the user interface, an indication of a selection of a stored food item to add to the preview menu; and second, adding the indicated selected stored food item to the preview menu; and storing the preview menu in the database.

7. The method of claim 6, wherein the indication of a selection of a stored food item comprises the user dragging a selected stored food item from the itemized panel onto the preview panel.

8. The method of claim 7, wherein the preview panel is updated instantly in accordance with the indicated style selection.

9. The method of claim 8, wherein the user interface comprises a web browser.

10. The method of claim 6, wherein formatting the preview menu in accordance with the indicated style selection comprises automatically fitting preview menu content to the preview menu.

* * * * *